United States Patent
Horiguchi et al.

(10) Patent No.: US 8,372,781 B2
(45) Date of Patent: Feb. 12, 2013

(54) CARBON CATALYST AND USE THEREOF

(75) Inventors: Shinichi Horiguchi, Tokyo (JP); Kiyokazu Yamazaki, Chiba (JP); Koji Kamata, Chiba (JP)

(73) Assignee: Nisshinbo Holdings, Inc., Tokyo (JP)

( * ) Notice: Subject to any disclaimer, the term of this patent is extended or adjusted under 35 U.S.C. 154(b) by 0 days.

(21) Appl. No.: 13/505,066

(22) PCT Filed: Oct. 1, 2010

(86) PCT No.: PCT/JP2010/067237
§ 371 (c)(1), (2), (4) Date: Apr. 30, 2012

(87) PCT Pub. No.: WO2011/055604
PCT Pub. Date: May 12, 2011

(65) Prior Publication Data
US 2012/0214662 A1    Aug. 23, 2012

(30) Foreign Application Priority Data

Nov. 5, 2009  (JP) .................. 2009-254059
Apr. 15, 2010 (JP) .................. 2010-094509

(51) Int. Cl.
B01J 20/00 (2006.01)
(52) U.S. Cl. ..................................... 502/417
(58) Field of Classification Search .......... 502/417; 423/582
See application file for complete search history.

(56) References Cited

U.S. PATENT DOCUMENTS
5,242,879 A  9/1993  Abe et al.
5,338,462 A  8/1994  Abe et al.

FOREIGN PATENT DOCUMENTS
JP  A-5-811         1/1993
JP  A-7-155609      6/1995
JP  A-2003-266081   9/2003
JP  A-2005-254129   9/2005
JP  A-2009-90178    4/2009

OTHER PUBLICATIONS

S. Haydar, C. Moreno-Castilla, M.A. Ferro-Garcfa, F. Carrasco-Mafin, J. Rivera-Utrilla, A. Perrard, J.P. Joly, Regularities in the temperature-programmed desorption spectra of CO2 and CO from activated carbons, Carbon, vol. 38, Issue 9, 2000, pp. 1297-1308, ISSN 0008-6223, 10.1016/S0008-6223(99)00256-0.*
Jul. 31, 2012 Office Action issued in Japanese Patent Application No. 2011-539320 (with partial English translation).
Dec. 28, 2010 International Search Report issued in International Patent Application No. PCT/JP2010/067237 (with translation).

* cited by examiner

Primary Examiner — Daniel C McCracken
Assistant Examiner — Richard M Rump
(74) Attorney, Agent, or Firm — Oliff & Berridge, PLC (57) ABSTRACT

Provided is a carbon catalyst having an excellent catalytic activity on the decomposition of hydrogen peroxide. The carbon catalyst is a carbon catalyst for decomposing hydrogen peroxide, which is obtained by impregnating a carbonized material, which is obtained by carbonization of raw materials containing an organic compound as a carbon source, a metal, and an electrically conductive carbon material, with a metal, and subjecting the resultant to a heat treatment.

10 Claims, 3 Drawing Sheets

| | CARBON CATALYST | 400°C | | 900°C | |
|---|---|---|---|---|---|
| | | CO(mmol) | $CO_2$(mmol) | CO(mmol) | $CO_2$(mmol) |
| COMPARATIVE EXAMPLE 1-1 | PCoAW | 0.007 | 0.006 | 0.243 | 0.072 |
| COMPARATIVE EXAMPLE 1-3 | KB | 0.004 | 0.007 | 0.122 | 0.025 |
| EXAMPLE 1-2 | PCoFeAW | 0.013 | 0.064 | 0.353 | 0.158 |
| EXAMPLE 1-3 | CoFeAW | 0.032 | 0.112 | 0.675 | 0.257 |
| EXAMPLE 1-4 | PCoFeAWZr | 0.025 | 0.072 | 0.531 | 0.193 |
| EXAMPLE 1-5 | PCoFeAWH$NO_3$ | 0.018 | 0.067 | 0.400 | 0.160 |

FIG.3

|  | CARBON CATALYST | 400°C | | 900°C | |
| --- | --- | --- | --- | --- | --- |
|  |  | CO(mmol) | $CO_2$(mmol) | CO(mmol) | $CO_2$(mmol) |
| COMPARATIVE EXAMPLE 1-1 | PCoAW | 0.007 | 0.006 | 0.243 | 0.072 |
| COMPARATIVE EXAMPLE 1-3 | KB | 0.004 | 0.007 | 0.122 | 0.025 |
| EXAMPLE 1-2 | PCoFeAW | 0.013 | 0.064 | 0.353 | 0.158 |
| EXAMPLE 1-3 | CoFeAW | 0.032 | 0.112 | 0.675 | 0.257 |
| EXAMPLE 1-4 | PCoFeAWZr | 0.025 | 0.072 | 0.531 | 0.193 |
| EXAMPLE 1-5 | PCoFeAWH$NO_3$ | 0.018 | 0.067 | 0.400 | 0.160 |

FIG.4

|  | CATALYST | HYDROGEN PEROXIDE CONCENTRATION AFTER TREATMENT (mg/mL) | DECOMPOSITION RATIO OF HYDROGEN PEROXIDE (%) |
| --- | --- | --- | --- |
| UNTREATED | — | 3400 | 0 |
| COMPARATIVE EXAMPLE 2-1 | $MnO_2$ | 1261 | 63 |
| COMPARATIVE EXAMPLE 2-2 | PCoAW | 1849 | 47 |
| EXAMPLE 2-3 | CoFeAW | 163 | 93 |
| EXAMPLE 2-2 | PCoFeAW | 262 | 92 |
| EXAMPLE 2-4 | PCoFeAWZr | 701 | 79 |

FIG.5

| | CATALYST | ADDITION CONCENTRATION OF $H_2O_2$ (mg/L) | pH | $COD_{Mn}$ (mg/L) | $COD_{Cr}$ (mg/L) | TOC (mg/L) | CHROMATICITY |
|---|---|---|---|---|---|---|---|
| RAW WATER | — | 0 | 6.5~7.5 | 53 | 99 | 54 | 391 |
| $H_2O_2$-ADDED RAW WATER | — | 500 | NOT ADJUSTED | 52 | — | 54 | 390 |
| COMPARATIVE EXAMPLE 4-1 | $FeCl_2$ | 100 | ADJUSTED TO 3 TO 4 | 25 | 46 | 22 | 12 |
| COMPARATIVE EXAMPLE 4-2 | | 500 | ADJUSTED TO 3 TO 4 | 19 | 44 | 21 | 9 |
| COMPARATIVE EXAMPLE 4-3 | $MnO_2$ | 100 | NOT ADJUSTED | 43 | — | 46 | 341 |
| COMPARATIVE EXAMPLE 4-4 | CoO | 500 | NOT ADJUSTED | 43 | — | 45 | 297 |
| EXAMPLE 4-1 | PCoFeAW | 100 | NOT ADJUSTED | 19 | 46 | 26 | 60 |
| EXAMPLE 4-2 | | 500 | NOT ADJUSTED | 17 | 44 | 20 | 51 |
| EXAMPLE 4-3 | | 500 | ADJUSTED TO 3 TO 4 | 21 | 39 | 14 | 42 |

CARBON CATALYST AND USE THEREOF

TECHNICAL FIELD

The present invention relates to a carbon catalyst and a use thereof, and in particular, to a carbon catalyst having an ability to decompose hydrogen peroxide.

BACKGROUND ART

A metal catalyst such as platinum or manganese dioxide has been used as a catalyst for decomposing hydrogen peroxide contained in a solution. It has also been proposed that activated carbon subjected to an activating treatment or activated carbon activated and caused to carry platinum be used for the decomposition of hydrogen peroxide (for example, Patent Literatures 1 and 2).

Meanwhile, a Fenton method involving adjusting the pH of waste water to an acidic value, and adding hydrogen peroxide and an iron(II) compound has been employed as a method of treating waste water.

PRIOR ART DOCUMENT

Citation List

Patent Document
[Patent Document 1] JP 05-000811 A
[Patent Document 2] JP 2009-90178 A

DISCLOSURE OF THE INVENTION

Problems to be Solved by the Invention

However, a platinum catalyst is not always preferred as a general-purpose catalyst because the catalyst is expensive and is limited in terms of its reserves. In addition, manganese dioxide applies a large environmental burden, and can be used in only a limited pH range because manganese dioxide is eluted at a low pH.

In addition, it cannot be said that activated carbon alone has a sufficiently high activity. Accordingly, a relatively large amount of the activated carbon is needed for the treatment. When the activated carbon carries platinum, problems such as cost or the like are inevitable, as described above.

In addition, the following problems have arisen. In a waste water treatment method based on the Fenton method, a chemical equivalent of the iron(II) compound must be continuously supplied for subjecting a substance to be treated to an oxidation treatment. In addition, operations become onerous because the pH needs to be adjusted to an acidic value at the time of the treatment and the waste water needs to be neutralized after the treatment. Further, an iron-containing precipitate to be produced as a by-product needs to be treated.

The present invention has been made in view of the problems, and an object of the present invention is to provide a carbon catalyst having an excellent catalytic activity on the decomposition of hydrogen peroxide and a use thereof.

Means for Solving the Problems

In a carbon catalyst for decomposing hydrogen peroxide according to an embodiment of the present invention for solving the problem, a total of a desorption amount of carbon monoxide and a desorption amount of carbon dioxide in a temperature programmed desorption method from 150° C. to 400° C. is 0.06 mmol or more per 0.02 g. According to the present invention, there is provided a carbon catalyst having an excellent catalytic activity on the decomposition of hydrogen peroxide.

In addition, the desorption amount of carbon monoxide may be 0.01 mmol or more and the desorption amount of carbon dioxide may be 0.05 mmol or more.

A carbon catalyst for decomposing hydrogen peroxide according to an embodiment of the present invention for solving the problem is obtained by impregnating a carbonized material, which is obtained by carbonization of raw materials containing an organic compound as a carbon source, a metal, and an electrically conductive carbon material, with a metal, and subjecting the resultant to a heat treatment. According to the present invention, there is provided a carbon catalyst having an excellent catalytic activity on the decomposition of hydrogen peroxide.

In addition, any one of the carbon catalysts for decomposing hydrogen peroxide may be used for decomposing hydrogen peroxide in a solution, a gas, or a mist. In addition, any one of the carbon catalysts for decomposing hydrogen peroxide may be used for promoting decomposition of an organic substance in a solution, a gas, or a mist in the presence of hydrogen peroxide.

A catalyst molded body for decomposing hydrogen peroxide according to an embodiment of the present invention for solving the problem includes anyone of the carbon catalysts for decomposing hydrogen peroxide, and a polymer binder. According to the present invention, there is provided a catalyst molded body having an excellent catalytic activity on the decomposition of hydrogen peroxide.

In addition, the polymer binder may contain a water-soluble polymer and a water-insoluble polymer. In addition, the catalyst molded body for decomposing hydrogen peroxide may have a porous structure formed by treating a molded body, which contains the carbon catalyst for decomposing hydrogen peroxide, and the polymer binder containing a water-soluble polymer and a water-insoluble polymer, with an aqueous solution to remove the water-soluble polymer in the polymer binder from the molded body.

In those cases, the water-soluble polymer may be one or two or more kinds selected from the group consisting of a polyacrylic acid, a polyethylene glycol, and a polyvinyl alcohol.

A catalyst composition according to an embodiment of the present invention for solving the problem includes any one of the carbon catalysts for decomposing hydrogen peroxide, and a polymer binder containing a water-soluble polymer and a water-insoluble polymer. According to the present invention, there is provided a catalyst composition containing a carbon catalyst having an excellent catalytic activity on the decomposition of hydrogen peroxide.

A treating apparatus according to an embodiment of the present invention for solving the problem includes a catalyst portion in which any one of the carbon catalysts for decomposing hydrogen peroxide is fixed, in which a solution, gas, or mist containing hydrogen peroxide is brought into contact with the catalyst portion so that the solution, the gas, or the mist is treated. According to the present invention, there is provided a treating apparatus including a carbon catalyst having an excellent catalytic activity on the decomposition of hydrogen peroxide.

Effect of the Invention

According to the present invention, there are provided a carbon catalyst having an excellent catalytic activity on the decomposition of hydrogen peroxide and a use thereof.

MODE FOR CARRYING OUT THE INVENTION

Hereinafter, an embodiment of the present invention is described. It should be noted that the present invention is not limited to an example described in the embodiment.

First, a carbon catalyst for decomposing hydrogen peroxide according to this embodiment (hereinafter, referred to as "catalyst of the present invention") is described. The inventors of the present invention have made extensive investigations on a carbon structure for realizing a carbon catalyst having a high catalytic activity on the decomposition of hydrogen peroxide on their own, in tandem with a method of producing a carbon catalyst to be described later. As a result, the inventors have made an invention relating to the catalyst of the present invention.

The catalyst of the present invention is, for example, a carbon catalyst in which the total of a desorption amount of carbon monoxide and a desorption amount of carbon dioxide in a temperature programmed desorption method from 150° C. to 400° C. is 0.06 mmol or more per 0.02 g. That is, when 0.02 g of the catalyst of the present invention is evaluated by the temperature programmed desorption method, the total amount of carbon monoxide and carbon dioxide to desorb during the heating of the catalyst of the present invention from 150° C. to 400° C. is 0.06 mmol or more.

In this case, the catalyst of the present invention may be, for example, a carbon catalyst with which in the temperature programmed desorption method from 150° C. to 400° C., the desorption amount of carbon monoxide is 0.01 mmol or more and the desorption amount of carbon dioxide is 0.05 mmol or more.

In addition, the total of the desorption amount of carbon monoxide and the desorption amount of carbon dioxide in the temperature programmed desorption method from 150° C. to 400° C. may be, for example, 0.07 mmol or more. In this case, for example, the desorption amount of carbon monoxide and the desorption amount of carbon dioxide may be 0.01 mmol or more and 0.06 mmol or more, respectively.

In addition, the catalyst of the present invention is, for example, a carbon catalyst with which the total of a desorption amount of carbon monoxide and a desorption amount of carbon dioxide in the temperature programmed desorption method from 150° C. to 900° C. is 0.4 mmol or more per 0.02 g. In this case, the catalyst of the present invention may be, for example, a carbon catalyst with which in the temperature programmed desorption method from 150° C. to 900° C., the desorption amount of carbon monoxide is 0.3 mmol or more and the desorption amount of carbon dioxide is 0.1 mmol or more.

In addition, the total of the desorption amount of carbon monoxide and the desorption amount of carbon dioxide in the temperature programmed desorption method from 150° C. to 900° C. may be, for example, 0.46 mmol or more per 0.02 g. In this case, for example, the desorption amount of carbon monoxide and the desorption amount of carbon dioxide may be 0.33 mmol or more and 0.13 mmol or more, respectively.

The desorption amounts of carbon monoxide and carbon dioxide in the temperature programmed desorption method can be determined by a known method. That is, first, a carbon catalyst is subjected to a heat treatment in a predetermined temperature programmed desorption apparatus so that a functional group (oxygen-containing compound) is desorbed from the surface of the carbon catalyst. Next, an oxygen gas is brought into contact with the carbon catalyst subjected to the heat treatment so that the surface of the carbon catalyst is caused to chemically adsorb oxygen. After that, the carbon catalyst is subjected to a heat treatment again, and then the amounts of carbon monoxide and carbon dioxide generated in association with the desorption of the functional group (oxygen-containing compound) from the surface of the carbon catalyst are determined.

The desorption amount of carbon monoxide and the desorption amount of carbon dioxide in the temperature programmed desorption method from 150° C. to 400° C. or 900° C. are determined as the total amounts of carbon monoxide and carbon dioxide that have desorbed during a period commencing when a carbon catalyst has been heated to 150° C. and ending upon further heating of the carbon catalyst so that its temperature increases to 400° C. or 900° C., respectively.

Such temperature programmed desorption method is employed in the evaluation of a carbon material for its active surface area (ASA). That is, a carbon atom (edge carbon) on a carbon network surface in a carbon catalyst has been proved to be chemically active because the carbon atom has an unsaturated $sp^2$ electron.

The edge carbon can be quantified by measuring the adsorption amount of an oxygen atom to the edge carbon, and the resultant quantity is an active surface area, which is regarded as a measure of the catalytic reactivity of the carbon catalyst. The temperature programmed desorption method is employed as a method of determining the active surface area.

As oxygen more easily adsorbs to an edge surface in the carbon catalyst than to its basal surface, the amount of the edge surface of the carbon catalyst can be indirectly determined by: causing the carbon catalyst from which a surface functional group has been removed by heating at high temperatures to adsorb oxygen; heating the carbon catalyst again after the adsorption; and determining the release amounts (desorption amounts) of carbon monoxide and carbon dioxide. Therefore, increases in the desorption amounts of carbon monoxide and carbon dioxide measured by the temperature programmed desorption method represent an increase in the active surface area of the carbon catalyst. In other words, the increases represent an increase in the catalytic activity of the carbon catalyst.

As a result of their extensive investigations, the inventors of the present invention have found on their own that the catalytic activity of a carbon catalyst on the decomposition of hydrogen peroxide is improved compared with a conventional one when the carbon catalyst has a carbon structure in which such desorption of carbon monoxide and carbon dioxide as described above occurs in the temperature programmed desorption method.

The catalyst of the present invention has larger desorption amounts of carbon monoxide and carbon dioxide measured by the temperature programmed desorption method than a conventional carbon catalyst does. Accordingly, the catalyst of the present invention contains a large amount of edge surfaces each having a large active surface area and high reactivity, and as a result, shows a higher catalytic activity on the decomposition of hydrogen peroxide than the conventional carbon catalyst does.

For example, the specific surface area of the catalyst of the present invention measured by a nitrogen adsorption BET method may be 10 $m^2/g$ or more, and may be preferably 100 $m^2/g$ or more. More specifically, for example, the specific surface area of the catalyst of the present invention may be 200 $m^2/g$ or more and 3,000 $m^2/g$ or less, and may be preferably 300 $m^2/g$ or more and 3,000 $m^2/g$ or less.

The catalyst of the present invention as described above may be, for example, a carbon catalyst for decomposing hydrogen peroxide to be used for decomposing hydrogen peroxide in a solution, a gas, or a mist. That is, in this case, the catalyst of the present invention is a catalyst for treating a solution, a gas, or a mist containing hydrogen peroxide to be decomposed and removed. A hydrogen peroxide-containing solution as an object to be treated is, for example, a cleaning fluid containing hydrogen peroxide to be used in the cleaning of a contact lens, or a waste liquid containing hydrogen peroxide remaining at the time of a bleaching and dyeing step or after the step.

In addition, in this case, a method of treating the solution, the gas, or the mist containing hydrogen peroxide with the catalyst of the present invention (hereinafter, referred to as "method of the present invention") may be, for example, a method involving bringing the solution, the gas, or the mist containing hydrogen peroxide to be decomposed into contact with the catalyst of the present invention to decompose and remove hydrogen peroxide contained in the solution, the gas, or the mist.

In addition, the catalyst of the present invention may be, for example, a carbon catalyst for decomposing hydrogen peroxide to be used for promoting the decomposition of an organic substance in a solution, a gas, or a mist in the presence of hydrogen peroxide. That is, in this case, the catalyst of the present invention is a catalyst for treating the solution, the gas, or the mist containing the organic substance to be decomposed and removed. The catalyst of the present invention promotes the decomposition reaction of the organic substance contained in the solution, the gas, or the mist in the presence of hydrogen peroxide because the catalyst of the present invention has an excellent catalytic activity on the decomposition of hydrogen peroxide. An organic substance-containing solution as an object to be treated is, for example, waste water from a factory, a hardly decomposable organic waste liquid that cannot be decomposed by a biological treatment, or recycled waste water for producing ultrapure water to be used at the time of the production of semiconductor and liquid crystal devices.

In addition, in this case, the method of the present invention may be, for example, a method involving bringing the solution, the gas, or the mist further containing the organic substance to be decomposed in addition to hydrogen peroxide into contact with the catalyst of the present invention to decompose and remove the organic substance contained in the solution, the gas, or the mist.

A catalyst molded body for decomposing hydrogen peroxide according to this embodiment (hereinafter, referred to as "catalyst molded body of the present invention") is a catalyst molded body for decomposing hydrogen peroxide containing the carbon catalyst for decomposing hydrogen peroxide (catalyst of the present invention) and a polymer binder.

The polymer binder is not particularly limited as long as the binder is effective in molding the catalyst molded body of the present invention, and one or two or more kinds of arbitrary binders can be used. That is, for example, the catalyst molded body of the present invention preferably contains a water-insoluble polymer because the catalyst molded body of the present invention is preferably used in the treatment of such solution as described above. The water-insoluble polymer is not particularly limited as long as the water-insoluble polymer is water-insoluble and usable as a binder, and may be one or two or more kinds selected from the group consisting of, for example, polyolefins such as a polytetrafluoroethylene, a polyvinylidene fluoride, a styrene-butadiene heteropolymer, a polyacrylonitrile, a polyvinyl butylal, a polypropyleneglycol, a polyethylene, and a polypropylene, a polyvinyl chloride, a polyester, a polyamide, and a polystyrene.

In addition, the polymer binder may contain a water-soluble polymer and a water-insoluble polymer. That is, in this case, the polymer binder may be a mixture of the water-soluble polymer and the water-insoluble polymer.

The water-soluble polymer is not particularly limited as long as the water-soluble polymer can be removed from the catalyst molded body of the present invention containing the water-soluble polymer by immersing and holding the catalyst molded body of the present invention in an aqueous solution to dissolve the water-soluble polymer in the aqueous solution. For example, the water-soluble polymer may be one or two or more kinds selected from the group consisting of a polyacrylic acid, a polyacrylamide, a polyisopropyl acrylamide, a polyethylene glycol, a polyvinyl alcohol, a polyvinyl pyrrolidone, methylcellulose, and starch.

When the polymer binder contains the water-soluble polymer, the catalyst molded body of the present invention may have, for example, a porous structure formed by treating a molded body, which contains the carbon catalyst for decomposing hydrogen peroxide and the polymer binder, with an aqueous solution to remove the water-soluble polymer in the polymer binder from the molded body.

That is, in this case, in the production of the catalyst molded body of the present invention, first, a raw material containing the catalyst of the present invention, and the polymer binder containing the water-soluble polymer and the water-insoluble polymer, is prepared. Next, the raw material is molded into a predetermined shape so that a molded body is obtained. Then, the molded body is treated with an aqueous solution by, for example, being immersed and held in the aqueous solution so that the water-soluble polymer is eluted from the molded body. The elution of the water-soluble polymer results in the formation of a porous structure on the surface of the molded body and in the molded body. Thus, the catalyst molded body of the present invention having a porous structure is obtained.

As the catalyst molded body of the present invention having a porous structure as described above has a large surface area, the activity of the catalyst of the present invention in the catalyst molded body of the present invention is effectively utilized. It should be noted that the shape of the catalyst molded body of the present invention is not particularly limited, and for example, the catalyst molded body of the present invention may be of a fibrous, rod-like, film-like, sheet-like, plate-like, block-like, cylindrical, polygonal columnar, granular, pellet-like, or powdery shape, or can be a hollow body or a foam.

In addition, a catalyst composition according to this embodiment (hereinafter, referred to as "catalyst composition of the present invention") is a catalyst composition containing the carbon catalyst for decomposing hydrogen peroxide (catalyst of the present invention), and the polymer binder containing the water-soluble polymer and the water-insoluble polymer. The catalyst composition of the present invention may be produced by mixing the catalyst of the present invention, and the polymer binder containing the water-soluble polymer and the water-insoluble polymer.

The catalyst composition of the present invention may be preferably used in the production of the catalyst molded body of the present invention having a porous structure as described above. That is, for example, when the catalyst composition of the present invention is a composition having fluidity (such as slurry), first, the catalyst composition of the present invention is coated on a predetermined base material or is filled in a predetermined mold. Next, the catalyst composition of the present invention is dried on the base material or in the mold so that a molded body is formed.

Then, as described above, the molded body is treated with an aqueous solution so that the water-soluble polymer is removed. Thus, the catalyst molded body of the present invention having a porous structure is produced. Specifically, for example, when the catalyst composition of the present invention is a composition for coating, the catalyst molded body of the present invention of a film-like shape having a porous structure is produced by: thinly coating the catalyst composition of the present invention on the surface of the base material; and performing drying and the removal of the water-soluble polymer as described above.

In this case, the catalyst molded body of the present invention may be, for example, a molded body which not only has a porous structure advantageous for the catalyst of the present invention to exert its activity but is also fixed so strongly onto the base material that the catalyst of the present invention does not desorb (the so-called powder fall does not occur).

Alternatively, the catalyst molded body of the present invention may be a catalyst molded body for decomposing hydrogen peroxide containing a base material and the catalyst of the present invention carried by the base material without the use of any binder. That is, in this case, for example, a base material made of a thermoplastic resin may be used. Specifically, for example, the catalyst molded body of the present invention may be produced without the use of any binder by: heating the base material made of a thermoplastic resin to a temperature around the softening point of the thermoplastic resin by a dry process; and causing the catalyst of the present invention to adhere to the surface of the base material in a state where the surface is molten. In the catalyst molded body of the present invention as described above, a thin catalyst layer containing the catalyst of the present invention is formed on the surface of the base material by stably solidifying the catalyst on the surface.

It should be noted that a mode where the catalyst of the present invention is utilized while being carried by the base material is not limited to the examples of the catalyst molded body of the present invention and the catalyst composition of the present invention. That is, the base material is not particularly limited as long as the base material carries the catalyst of the present invention. Specifically, for example, an organic fiber carrier made of paper, cotton, a natural fiber, a synthetic fiber, a semi-synthetic fiber, a chemical fiber, or the like, or an inorganic fiber carrier may be used. An inorganic material such as ceramic (e.g., alumina or cordierite), a tile, or glass, or a metal may also be used.

In addition, the shape of a decomposing material containing the catalyst of the present invention is not limited to the examples as described above, and for example, the decomposing material may be fibrous, wool-like, rod-like, film-like, sheet-like, net-like, honeycomb, pleated, corrugated, corrugated honeycomb, plate-like, block-like, cylindrical, polygonal columnar, granular, pellet-like, or a powdery shape, or can be a hollow body, a foam, or a porous structure. In addition, such decomposing material can be, for example, a powder, a slurry, a paint, a cake, a paper, a woven fabric, a knitted fabric, a non-woven fabric, a filter, a coated sheet, a multi-layered body, a gel, an ionic gel, or an ionic liquid gel.

In addition, examples of the uses of the catalyst of the present invention and the decomposing material containing the catalyst of the present invention include: the treatment of waste water containing hydrogen peroxide (bleached and dyed waste water or a hardly decomposable organic waste liquid); a recycled waste liquid; nuclear reactor waste water; ozone removal (ozone decomposition product); food processing; the waste liquid treatment of a hydrogen peroxide-based metal treatment liquid; the treatment of a hydrogen peroxide-containing liquid in the electronic industry; the treatment of a mist or gas of hydrogen peroxide; the decoloring treatment of colored waste water (used in combination with hydrogen peroxide); the treatment of a copper etching waste liquid; a treatment for the production of hydrogen from a hydrogen-rich compound by the decomposition of hydrogen peroxide; an oxygen production treatment; an air cleaning apparatus (removal of hydrogen peroxide); an air sterilization apparatus; a solid-liquid separation catalyst utilizing a decomposed gas of hydrogen peroxide; a catalyst for the production of oxidizing water through the decomposition of hydrogen peroxide; and a catalyst for synthesizing a chemical utilizing a hydrogen peroxide decomposition product (active oxygen). In addition, an object for which each of the catalyst of the present invention and the decomposing material containing the catalyst of the present invention is utilized is, for example, the atmosphere, soil, seawater, drainage, clear water, industrial water, an exhaust gas from a factory, an exhaust gas from an internal combustion engine, or an exhaust gas from an analytical instrument.

Next, a treating apparatus according to this embodiment (hereinafter, referred to as "apparatus of the present invention") is described. The apparatus of the present invention is an apparatus including a catalyst portion in which the carbon catalyst for decomposing hydrogen peroxide (catalyst of the present invention) is fixed, the apparatus bringing a solution, a gas, or a mist containing hydrogen peroxide into contact with the catalyst portion to treat the solution, the gas, or the mist.

Figure 1:
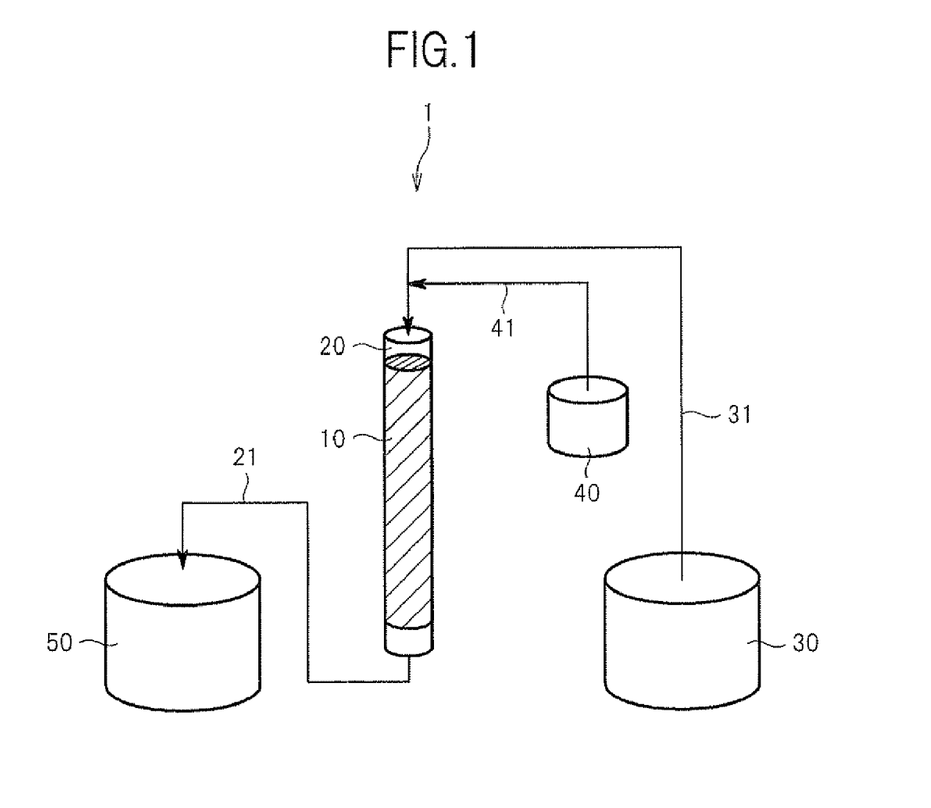
FIG. 1 is an explanatory diagram illustrating the main construction of an example of a treating apparatus including a carbon catalyst for decomposing hydrogen peroxide according to an embodiment of the present invention.

FIG. 1 is an explanatory diagram illustrating the main construction of an example of the apparatus of the present invention. It should be noted that description is given here by taking the case where a solution containing hydrogen peroxide is treated as an example. In the example illustrated in FIG. 1, an apparatus 1 of the present invention includes: a catalyst portion 20 in which a catalyst 10 of the present invention is fixed; a raw water-supplying portion 30 for supplying a solution (raw water) as an object to be treated; a hydrogen peroxide-supplying portion 40 for supplying hydrogen peroxide; and a treated liquid-recovering portion 50 for recovering the solution (treated liquid) treated by the catalyst portion 20.

The catalyst portion 20 is not particularly limited as long as the catalyst 10 of the present invention is fixed in the portion and the raw water contacts the portion. That is, in the example illustrated in FIG. 1, the catalyst portion 20 is a tubular body in which the catalyst 10 of the present invention is fixed. A method of fixing the catalyst 10 of the present invention in the catalyst portion 20 is not particularly limited as long as the catalyst 10 of the present invention fixed by the method functions. For example, a method involving fixing the catalyst of the present invention to the inner surface of the catalyst portion 20 by coating, or a method involving loading, into the catalyst portion 20, a molded body in which the catalyst of the present invention is fixed (such as the catalyst molded body of the present invention of a pellet-like, fibrous, or plate-like shape) or the catalyst composition of the present invention may be used.

Here, the treatment of the solution by the apparatus 1 of the present invention is described. That is, first, a liquid-delivering apparatus (not shown) such as a pump connected to the apparatus 1 of the present invention is operated so that the raw water is made to flow into the catalyst portion 20 from the raw water-supplying portion 30 through a supply channel 31. At this time, hydrogen peroxide is added to the raw water before its flow into the catalyst portion 20 from the hydrogen peroxide-supplying portion 40 through an addition channel 41. Therefore, the raw water to which hydrogen peroxide has been added flows into the catalyst portion 20.

The raw water that has flowed into the catalyst portion 20 flows in the catalyst portion 20 while contacting the catalyst 10 of the present invention fixed in the catalyst portion 20. The raw water flowing in the catalyst portion 20 is treated by the catalyst 10 of the present invention. That is, an organic substance contained in the raw water is efficiently decomposed by the catalytic activity of the catalyst 10 of the present invention in the presence of hydrogen peroxide.

Then, the treated liquid that has been treated by the catalyst 10 of the present invention and flowed out of the catalyst portion 20 is recovered by the treated liquid-recovering portion 50 through a recovery channel 21. Thus, the treated liquid whose organic substance content concentration has been effectively reduced compared with that in the raw water is efficiently obtained with the apparatus 1 of the present invention.

It should be noted that the construction of the apparatus of the present invention is not limited to the example illustrated in FIG. 1. That is, the apparatus of the present invention is not required to include any such other construction as illustrated in FIG. 1 as long as the apparatus of the present invention includes the catalyst portion 20 in which the raw water is treated. For example, the apparatus of the present invention may be an apparatus that performs the treatment according to a batch mode instead of such an apparatus as illustrated in FIG. 1 which performs a continuous treatment. In addition, the apparatus of the present invention can treat a gas or a mist containing hydrogen peroxide as in the case of a solution.

Figure 2:
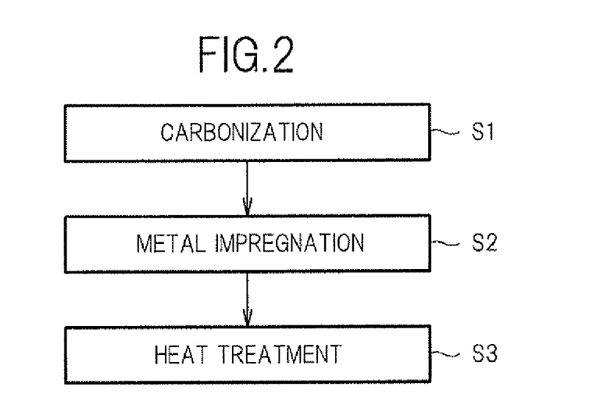
FIG. 2 is an explanatory diagram illustrating main steps in an example of a method of producing the carbon catalyst for decomposing hydrogen peroxide according to the embodiment of the present invention.

Next, a method of producing a carbon catalyst for decomposing hydrogen peroxide according to this embodiment (hereinafter, referred to as "production method of the present invention") is described. FIG. 2 is an explanatory diagram illustrating main steps in an example of the production method of the present invention. As illustrated in FIG. 2, the production method of the present invention includes a carbonization step S1, a metal impregnation step S2, and a heat treatment step S3.

In the carbonization step S1, raw materials containing an organic compound as a carbon source, a metal, and an electrically conductive carbon material are carbonized so that a carbonized material is obtained. The organic compound in the raw materials is not particularly limited as long as the compound can be carbonized, and one or two or more kinds of arbitrary compounds may be used. That is, one or both of a high-molecular weight organic compound (e.g., a resin such as a thermoplastic resin or a thermosetting resin) and a low-molecular weight organic compound may be used as the organic compound, and biomass may also be used.

In addition, for example, an organic compound containing nitrogen may be preferably used as the organic compound. The organic compound containing nitrogen is not particularly limited as long as the compound contains a nitrogen atom in a molecule thereof, and one or two or more kinds of arbitrary compounds may be used.

In addition, for example, a ligand that coordinates to a metal may be preferably used as the organic compound. That is, in this case, an organic compound containing one or more ligand atoms in a molecule thereof is used. More specifically, for example, an organic compound containing, as a ligand atom, one or two or more kinds selected from the group consisting of a nitrogen atom, a phosphorus atom, an oxygen atom, and a sulfur atom in a molecule thereof may be used. For example, an organic compound containing, as a ligand group, one or two or more kinds selected from the group consisting of an amino group, a phosphino group, a carboxyl group, and a thiol group in a molecule thereof may also be used.

Specifically, for example, one or two or more kinds selected from the group consisting of pyrolle, vinylpyridine, imidazole, 2-methylimidazole, aniline, a polysulfone, a polyaminobismaleimide, a polyimide, a polyvinyl alcohol, a polybenzoimidazole, a polyamide, a polyether, a polyetheretherketone, cellulose, lignin, chitin, chitosan, silk, wool, a polyamino acid, a nucleic acid, DNA, RNA, hydrazine, hydrazide, urea, an ionomer, a polyacrylate, a polyacrylate ester, a polymetacrylate ester, a polymetacrylate, a phenol resin, a melamine resin, an epoxy resin, a furan resin, a polyamideimide resin, and a polyacrylonitrile may be used as the organic compound.

The organic compound may further contain, for example, one or two or more kinds selected from the group consisting of boron, phosphorus, oxygen, and sulfur as a component for improving the activity of the carbon catalyst to be produced by the production method of the present invention.

The metal in the raw materials is not particularly limited as long as the metal does not inhibit the activity of the carbon catalyst to be produced by the production method of the present invention, and one or two or more kinds of arbitrary metals may be used. The metal may be, for example, one or two or more kinds selected from the group consisting of Groups 3 to 16 of the periodic table. That is, one or two or more kinds selected from the group consisting of Group 3A (Group 3) element, Group 4A (Group 4) element, Group 5A (Group 5) element, Group 6A (Group 6) element, Group 7A (Group 7) element, Group 8 (Groups 8, 9, and 10) element, Group 1B (Group 11) element, Group 2B (Group 12) element, Group 3B (Group 13) element, Group 4B (Group 14) element, Group 5B (Group 15) element, and Group 6B (Group 16) element of the periodic table may be used.

In addition, for example, a transition metal (belonging to Groups 3 to 12 of the periodic table) may be preferably used as the metal. Further, a metal belonging to the fourth period of Groups 3 to 12 of the periodic table may be preferably used as the transition metal.

Specifically, for example, one or two or more kinds selected from the group consisting of scandium (Sc), titanium (Ti), vanadium (V), chromium (Cr), manganese (Mn), iron (Fe), cobalt (Co), nickel (Ni) copper (Cu), zinc (Zn), yttrium (Y), zirconium (Zr), niobium (Nb), molybdenum (Mo), ruthenium (Ru), rhodium (Rh), palladium (Pd) lanthanoids (cerium (Ce) etc.), and actinoids may be preferably used, and one or two or more kinds selected from the group consisting of manganese, iron, cobalt, nickel, and copper may be more preferably used.

The metal may be used as the simple substance of the metal or a compound of the metal. For example, a metal salt, a metal oxide, a metal hydroxide, a metal nitride, a metal sulfide, a metal carbide, or a metal complex can be used as the metal compound. Of those, the metal salt, the metal oxide, the metal sulfide, or the metal complex may be preferably used. It should be noted that when a ligand is used as the organic compound, a metal complex is to be formed in the raw materials.

The electrically conductive carbon material in the raw materials is not particularly limited as long as the material imparts electrical conductivity to the carbon catalyst to be produced by the production method of the present invention, or improves the electrical conductivity of the carbon catalyst, and one or two or more kinds of arbitrary materials may be used. That is, for example, a carbon material that has electrical conductivity but does not have any catalytic activity by itself may be used as the electrically conductive carbon material.

Specifically, for example, one or two or more kinds selected from the group consisting of carbon black, carbon nanotube, carbon nanohorn, carbon fiber, carbon fibril, a graphite powder may be used.

The electrically conductive carbon material that has been caused to carry the metal in the raw materials in advance may also be used. That is, in this case, for example, an electrically conductive carbon material carrying a transition metal that improves the activity or oxidation resistance of the carbon catalyst may be used. As the transition metal, for example, one or two or more kinds selected from the group consisting of scandium, titanium, vanadium, chromium, manganese, iron, cobalt, nickel, copper, zinc, yttrium, zirconium, niobium, molybdenum, ruthenium, rhodium, palladium, lanthanoids (cerium etc.), and actinoids may be used.

In the carbonization step S1, prior to the carbonization, the raw materials containing such organic compound, metal, and electrically conductive carbon material as described above are mixed. A method of mixing the raw materials is not particularly limited, and for example, a mortar or a stirring apparatus may be used. One or two or more kinds of mixing methods such as powder mixing involving mixing the organic compound, the metal, and the electrically conductive carbon material in powdery states, and solvent mixing involving adding and mixing a solvent may also be employed.

Then, in the carbonization step S1, the raw materials prepared as described above are carbonized. That is, the raw materials are heated and held at a predetermined temperature such that the raw materials are carbonized (carbonization temperature).

The carbonization temperature is not particularly limited as long as the raw materials are carbonized at the temperature, and for example, the temperature may be 300° C. or more. More specifically, for example, the carbonization temperature may be 300° C. or more and 1,500° C. or less, may be preferably 400° C. or more and 1,200° C. or less, and may be more preferably 500° C. or more and 1,100° C. or less.

A rate of temperature increase upon heating of the raw materials to the carbonization temperature is not particularly limited and may be, for example, 0.5° C./min or more and 300° C./min or less. The time period for which the raw materials are held at the carbonization temperature (carbonization time) is not particularly limited as long as the raw materials are carbonized within the time period, and for example, the time may be 5 minutes or more. More specifically, for example, the carbonization time may be 5 minutes or more and 240 minutes or less, and may be preferably 20 minutes or more and 180 minutes or less. In addition, the carbonization is preferably performed in an inert gas such as nitrogen (e.g., in a flow of the inert gas).

Thus, in the carbonization step S1, the carbonized material produced by the carbonization of the raw materials is obtained. It should be noted that the resultant carbonized material may be pulverized. A method of pulverizing the carbonized material is not particularly limited, and for example, a pulverizing apparatus such as a ball mill or a bead mill may be used. For example, the average particle diameter of the carbonized material after the pulverization may be 150 μm or less, and may be preferably 45 μm or less.

In addition, a nitrogen atom may be introduced (doped) into the resultant carbonized material. For example, a vapor phase doping method such as an ammoxidation method or a CVD method, a liquid phase doping method, or a vapor phase-liquid phase doping method may be employed as a method of introducing a nitrogen atom. Specifically, for example, a nitrogen atom may be introduced into the surface of the carbonized material by: mixing a nitrogen source such as ammonia, melamine, or acetonitrile with the carbonized material; and holding the resultant mixture under the atmosphere of an inert gas such as nitrogen, argon, or helium at a temperature of 550° C. or more and 1,200° C. or less for a time period of 5 minutes or more and 180 minutes or less. In addition, the resultant carbonized material may be subjected to an activating treatment such as steam activation, carbon dioxide activation, phosphoric acid activation, alkali activation, hydrogen activation, ammonia activation, activation with nitrogen oxide, or electrolytic activation and/or liquid phase oxidation such as nitric acid oxidation, mixed acid oxidation, or hydrogen peroxide oxidation.

In the subsequent metal impregnation step S2, the carbonized material obtained in the carbonization step S1 is impregnated with a metal. The metal with which the carbonized material is impregnated is not particularly limited as long as the metal does not inhibit the activity of the carbon catalyst to be produced by the production method of the present invention, and one or two or more kinds of arbitrary metals may be used.

The metal may be, for example, one or two or more kinds selected from the group consisting of Groups 3 to 16 of the periodic table. In addition, for example, a transition metal (belonging to Groups 3 to 12 of the periodic table) may be preferably used as the metal. Further, a metal belonging to the fourth period, fifth period, or sixth period of Groups 3 to 12 of the periodic table may be preferably used as the transition metal.

Specifically, for example, one or two or more kinds selected from the group consisting of titanium, chromium, manganese, iron, cobalt, nickel, copper, zinc, zirconium, niobium, molybdenum, ruthenium, lanthanum, cerium, and tantalum can be preferably used, and one or two or more kinds selected from the group consisting of titanium, iron, zirconium, ruthenium, and cerium may be more preferably used.

In addition, in the metal impregnation step S2, the carbonized material may be impregnated with a metal of a kind different from the metal in the raw materials used in the carbonization step S1. That is, for example, the carbonized material may be impregnated with one or two or more kinds selected from the group consisting of aluminum, silicon, titanium, chromium, manganese, iron, cobalt, nickel, copper, zinc, gallium, zirconium, niobium, molybdenum, ruthenium, indium, tin, lanthanum, cerium, tantalum, and lead or from the group consisting of titanium, iron, zirconium, ruthenium, and cerium, and different from the metal in the raw materials.

The metal may be used as the simple substance of the metal or a compound of the metal. For example, a metal salt, a metal oxide, a metal hydroxide, a metal nitride, a metal sulfide, a metal carbide, or a metal complex can be used as the metal compound. Of those, the metal salt, the metal oxide, the metal sulfide, or the metal complex may be preferably used.

A method of impregnating the carbonized material with the metal in the metal impregnation step S2 is not particularly limited as long as at least the surface of the carbonized material is impregnated with the metal, and for example, a method involving bringing the carbonized material into contact with a solution containing the metal may be employed.

That is, the carbonized material may be impregnated with the metal by, for example, immersing and holding the carbonized material in a metal-containing solution. In this case, the carbonized material may be held in the metal-containing solution that has been boiled. In addition, an acidic solution may be used as the metal-containing solution. In this case, the pH of the metal-containing solution may be, for example, 1 or more and 6 or less.

In the subsequent heat treatment step S3, the carbonized material that has been impregnated with the metal in the metal impregnation step S2 is subjected to a heat treatment. The heat treatment is performed by holding the carbonized material at a predetermined temperature (heat treatment temperature).

That is, in the heat treatment step S3, the carbonized material is heated at, for example, 300° C. or more. The heat treatment temperature may be, for example, 400° C. or more. More specifically, for example, the heat treatment temperature may be 300° C. or more and 1,500° C. or less, may be preferably 400° C. or more and 1,400° C. or less, and may be more preferably 500° C. or more and 1,300° C. or less.

The heat treatment temperature may be the same temperature as the carbonization temperature, or may be a temperature different from the carbonization temperature. That is, for example, the heat treatment temperature may be a temperature equal to or lower than the carbonization temperature of the raw materials in the carbonization step S1, or may be a temperature lower than the carbonization temperature. Alternatively, the heat treatment temperature may be a temperature higher than the carbonization temperature.

Specifically, for example, when the carbonization temperature in the carbonization step S1 is 400° C. or more and 1,100° C. or less, the heat treatment temperature may be a temperature that is 300° C. or more and 1,000° C. or less, and is equal to or lower than the carbonization temperature or is lower than the carbonization temperature.

A rate of temperature increase upon heating of the carbonized material to the heat treatment temperature is not particularly limited and may be, for example, 0.5° C./min or more and 300° C./min or less. The time period for which the carbonized material is held at the heat treatment temperature (heat treatment time) is not particularly limited as long as an effect of the heat treatment is obtained within the time, and for example, the time may be 5 minutes or more. More specifically, for example, the heat treatment time may be 5 minutes or more and 240 minutes or less, and may be preferably 20 minutes or more and 180 minutes or less. In addition, the heat treatment is preferably performed in an inert gas such as nitrogen (e.g., in a flow of the inert gas).

Thus, in the heat treatment step S3, the carbonized material subjected to the heat treatment after the impregnation with the metal is obtained. It should be noted that the resultant carbonized material may be pulverized. A method of pulverizing the carbonized material is not particularly limited, and for example, a pulverizing apparatus such as a ball mill or a bead mill may be used. For example, the average particle diameter of the carbonized material after the pulverization may be 150 μm or less, and may be preferably 45 μm or less.

In the production method of the present invention, the carbonized material obtained in the heat treatment step S3 may be obtained as a carbon catalyst. According to the production method of the present invention including the carbonization step S1, the metal impregnation step S2, and the heat treatment step S3 as described above, a carbon catalyst whose activity has been improved compared with a conventional one is produced. That is, the production method of the present invention effectively improves the activity of the carbon catalyst by including, in particular, the metal impregnation step S2 and the heat treatment step S3.

Although a carbonized material having a catalytic activity is obtained in the carbonization step S1 in the production method of the present invention, the catalytic activity is significantly improved by further subjecting the carbonized material to a metal impregnation treatment and a heat treatment.

The mechanism via which the activity of the carbon catalyst is improved by the metal impregnation treatment and the heat treatment may be, for example, that a new carbon structure different from a carbon structure formed by the carbonization is formed by the metal impregnation treatment and the heat treatment.

It should be noted that while the metal in the raw materials is placed not only on the surface of the carbonized material but also in the entirety of the inside thereof while being dispersed therein, the metal with which the carbonized material has been impregnated in the metal impregnation step S2 is locally placed mainly on the surface of the carbonized material and a vicinity thereof.

Therefore, it is said that the metal impregnation treatment and the heat treatment each have an aspect of a surface treatment for the carbonized material. In terms of the foregoing as well, the carbon structure formed by the metal impregnation treatment and the heat treatment may be different from the carbon structure formed by the carbonization.

In addition, in the production method of the present invention, a treatment for removing a metal in the carbonized material (metal removal treatment) may be performed as required (for example, when the metal is unnecessary after the carbonization).

That is, the production method of the present invention may further include: a metal removal step of subjecting the carbonized material that has been subjected to the heat treatment in the heat treatment step S3 to a metal removal treatment; and an after-metal removal heat treatment step of subjecting the carbonized material that has been subjected to the metal removal treatment to a heat treatment.

The metal removal treatment is not particularly limited as long as a metal in the carbonized material is removed or the amount of the metal is reduced by the treatment, and for example, a washing treatment with an acid or an electrolytic treatment may be performed.

The acid to be used in the acid washing is not particularly limited as long as an effect of the metal removal treatment is obtained, and one or two or more kinds of arbitrary acids may be used. That is, for example, one or two or more kinds selected from the group consisting of hydrochloric acid (such as concentrated hydrochloric acid), nitric acid (such as concentrated nitric acid), and sulfuric acid (such as concentrated sulfuric acid) may be used. When two or more kinds of acid are used, for example, a mixed acid prepared by mixing concentrated hydrochloric acid and concentrated nitric acid at a predetermined volume ratio (such as aqua regia), or a mixed acid prepared by mixing concentrated nitric acid and concentrated sulfuric acid at a predetermined volume ratio, may be used.

A method for the acid washing is not particularly limited as long as the effect of the metal removal treatment is obtained, and for example, a method involving immersing and holding the carbonized material in a solution containing an acid may be employed. In this case, the carbonized material may be held in a boiling acid solution.

In the subsequent after-metal removal heat treatment step, the same heat treatment as the heat treatment in the heat treatment step S3 is performed. Thus, in the after-metal removal heat treatment step, a carbonized material subjected to the heat treatment after the metal removal is obtained. It should be noted that the resultant carbonized material may be pulverized as with the carbonized material subjected to the heat treatment in the heat treatment step S3.

In addition, in the production method of the present invention, the carbonized material obtained in the after-metal removal heat treatment step may be obtained as a carbon catalyst. A carbon catalyst with an additionally improved activity is produced by performing such metal removal treatment and after-metal removal heat treatment. That is, in this case, the activity of the carbon catalyst is effectively improved by, for example, removing a metal component from the carbonized material to expose an active site.

It should be noted that in the production method of the present invention, the metal impregnation treatment may be performed in the metal impregnation step S2 without subjecting the carbonized material obtained in the carbonization step S1 to such metal removal treatment as described above. That is, in this case, in the metal impregnation step S2, the carbonized material is impregnated with the metal without the removal of the metal that had been contained in the raw materials from the carbonized material. Alternatively, the metal impregnation treatment may be performed after the carbonized material has been subjected to the metal removal treatment. That is, in this case, in the metal impregnation step S2, the carbonized material from which the metal that had been contained in the raw materials has been removed is impregnated with the metal.

Alternatively, the production method of the present invention may further include: an additional metal impregnation step of further impregnating the carbonized material that has been subjected to the heat treatment in the heat treatment step S3 with a metal; and an additional heat treatment step of subjecting the carbonized material impregnated with the metal in the additional metal impregnation step to a heat treatment. That is, the production method of the present invention includes, for example, the carbonization step S1, the metal impregnation step S2, the heat treatment step S3, the additional metal impregnation step, and the additional heat treatment step.

In the additional metal impregnation step, the metal with which the carbonized material is impregnated is not particularly limited as long as the metal does not inhibit the activity of the carbon catalyst to be produced by the production method of the present invention, and one or two or more kinds of arbitrary metals may be used.

The metal may be, for example, one or two or more kinds selected from the group consisting of Groups 3 to 16 of the periodic table. In addition, for example, a transition metal (belonging to Groups 3 to 12 of the periodic table) may be preferably used as the metal. Further, a metal belonging to the fourth period, fifth period, or sixth period of Groups 3 to 12 of the periodic table may be preferably used as the transition metal.

Specifically, for example, one or two or more kinds selected from the group consisting of titanium, chromium, manganese, iron, cobalt, nickel, copper, zinc, zirconium, niobium, molybdenum, ruthenium, lanthanum, cerium, and tantalum can be preferably used, and one or two or more kinds selected from the group consisting of titanium, iron, zirconium, ruthenium, and cerium may be more preferably used.

In addition, in the additional metal impregnation step, the carbonized material may be impregnated with a metal of a kind different from the metal in the raw materials used in the carbonization step S1. That is, for example, the carbonized material may be impregnated with one or two or more kinds selected from the group consisting of aluminum, silicon, titanium, chromium, manganese, iron, cobalt, nickel, copper, zinc, gallium, zirconium, niobium, molybdenum, ruthenium, indium, tin, lanthanum, cerium, tantalum, and lead, or from the group consisting of titanium, iron, zirconium, ruthenium, and cerium, and different from the metal in the raw materials.

In addition, in the additional metal impregnation step, the carbonized material may be impregnated with a metal of a kind different from the metal with which the material has been impregnated in the metal impregnation step S2. That is, for example, the carbonized material may be impregnated with one or two or more kinds selected from the group consisting of aluminum, silicon, titanium, chromium, manganese, iron, cobalt, nickel, copper, zinc, gallium, zirconium, niobium, molybdenum, ruthenium, indium, tin, lanthanum, cerium, tantalum, and lead, or from the group consisting of titanium, iron, zirconium, ruthenium, and cerium, and different from the metal with which the carbonized material has been impregnated in the metal impregnation step S2. In addition, in the additional metal impregnation step, the carbonized material may be impregnated with a metal of a kind different from the metal with which the material has been impregnated in the metal impregnation step S2, the metal being capable of having a valence of 4. That is, in this case, for example, the carbonized material is impregnated with a divalent or trivalent metal in the metal impregnation step S2, and then the carbonized material is impregnated with a tetravalent metal in the additional metal impregnation step.

The metal may be used as the simple substance of the metal or a compound of the metal. For example, a metal salt, a metal oxide, a metal hydroxide, a metal nitride, a metal sulfide, a metal carbide, or a metal complex can be used as the metal compound. Of those, the metal salt, the metal oxide, the metal sulfide, or the metal complex may be preferably used.

A method of impregnating the carbonized material with the metal in the additional metal impregnation step is not particularly limited as long as at least the surface of the carbonized material is impregnated with the metal, and for example, a method involving bringing the carbonized material into contact with a solution containing the metal may be employed.

That is, the carbonized material may be impregnated with the metal by, for example, immersing and holding the carbonized material in a metal-containing solution. In this case, the carbonized material may be held in the metal-containing solution that has been boiled. In addition, an acidic solution may be used as the metal-containing solution. In this case, the pH of the metal-containing solution may be, for example, 1 or more and 6 or less.

In the subsequent additional heat treatment step, the same heat treatment as the heat treatment in the heat treatment step S3 is performed. It should be noted that a heat treatment temperature in the additional heat treatment step may be the same temperature as the heat treatment temperature in the heat treatment step S3, or may be a temperature different from the heat treatment temperature.

Thus, in the additional heat treatment step, a carbonized material subjected to the heat treatment after the additional metal impregnation treatment is obtained. It should be noted that the resultant carbonized material may be pulverized as in the carbonized material subjected to the heat treatment in the heat treatment step S3. In addition, in the production method of the present invention, the additional metal impregnation step and the additional heat treatment step may each be repeated twice or more.

In the production method of the present invention, the carbonized material obtained in the additional heat treatment step is obtained as a carbon catalyst. A carbon catalyst with an additionally improved activity is produced by performing such additional metal impregnation treatment and additional heat treatment. That is, in this case, the activity of the carbon catalyst is effectively improved by, for example, further forming a new carbon structure.

Alternatively, the production method of the present invention may further include the additional metal impregnation step and the additional heat treatment step, and the metal removal step and the after-metal removal heat treatment step. That is, the production method of the present invention includes, for example, the carbonization step S1, the metal impregnation step S2, the heat treatment step S3, the metal removal step, the after-metal removal heat treatment step, the additional metal impregnation step, and the additional heat treatment step.

In this case, in the additional metal impregnation step, the carbonized material subjected to the metal removal treatment and the after-metal removal heat treatment after the heat treatment in the heat treatment step S3 is impregnated with a metal again. When the additional metal impregnation step and the additional heat treatment step are each repeated twice or more, the carbonized material after the heat treatment in each additional heat treatment step may be subjected to a metal removal treatment and an after-metal removal heat treatment.

Alternatively, the production method of the present invention may further include: an acid treatment step of subjecting the carbonized material subjected to the heat treatment in the heat treatment step S3 to an acid treatment; and an after-acid treatment heat treatment step of subjecting the carbonized material subjected to the acid treatment to a heat treatment. That is, the production method of the present invention includes, for example, the carbonization step S1, the metal impregnation step S2, the heat treatment step S3, the acid treatment step, and the after-acid treatment heat treatment step.

An acid to be used in the acid treatment is not particularly limited as long as an effect of the acid treatment is obtained, and one or two or more kinds of arbitrary acid may be used. That is, for example, one or two or more kinds selected from the group consisting of hydrochloric acid (such as concentrated hydrochloric acid), nitric acid (such as concentrated nitric acid), and sulfuric acid (such as concentrated sulfuric acid) may be used. When two or more kinds of acid are used, for example, a mixed acid prepared by mixing concentrated hydrochloric acid and concentrated nitric acid at a predetermined volume ratio (such as aqua regia), or a mixed acid prepared by mixing concentrated nitric acid and concentrated sulfuric acid at a predetermined volume ratio may be used.

A method for the acid treatment is not particularly limited as long as the effect of the acid treatment is obtained, and for example, a method involving immersing and holding the carbonized material in a solution containing an acid may be employed. In this case, the carbonized material may be held in the acid solution that has been boiled. It should be noted that the carbonized material may be subjected to an acid treatment by washing the carbonized material with an acid in the metal removal step. That is, the acid washing for metal removal may be a mode of the acid treatment as a surface treatment.

In the subsequent after-acid treatment heat treatment step, the same heat treatment as the heat treatment in the heat treatment step S3 is performed. Thus, in the after-acid treatment heat treatment step, a carbonized material subjected to the heat treatment after the acid treatment is obtained. It should be noted that the resultant carbonized material may be pulverized as in the carbonized material subjected to the heat treatment in the heat treatment step S3. In addition, in the production method of the present invention, the acid treatment step and the after-acid treatment heat treatment step may each be repeated twice or more.

In addition, in the production method of the present invention, the carbonized material obtained in the after-acid treatment heat treatment step may be obtained as a carbon catalyst. A carbon catalyst with an additionally improved activity is produced by performing such acid treatment and after-acid treatment heat treatment. That is, in this case, the activity of the carbon catalyst is effectively improved by, for example, introducing a new functional group on the surface of the carbonized material and the vicinity thereof.

Alternatively, the production method of the present invention may further include the acid treatment step and the after-acid treatment heat treatment step, and the metal removal step and the after-metal removal heat treatment step. That is, the production method of the present invention includes, for example, the carbonization step S1, the metal impregnation step S2, the heat treatment step S3, the metal removal step, the after-metal removal heat treatment step, the acid treatment step, and the after-acid treatment heat treatment step.

In this case, in the acid treatment step, the carbonized material subjected to the metal removal treatment and the after-metal removal heat treatment after the heat treatment in the heat treatment step S3 is subjected to an acid treatment. When the acid treatment step and the after-acid treatment heat treatment step are each repeated twice or more, the carbonized material after the heat treatment in each after-acid treatment heat treatment step may be subjected to a metal removal treatment and an after-metal removal heat treatment.

As described above, the catalyst of the present invention may be, for example, a carbon catalyst obtained by impregnating a carbonized material, which is obtained by the carbonization of raw materials containing an organic compound as a carbon source, a metal, and an electrically conductive carbon material, with a metal; and subjecting the resultant to a heat treatment.

In this case, the catalyst of the present invention is preferably produced by the production method of the present invention. That is, the catalyst of the present invention may be a carbon catalyst produced by the production method of the present invention including, for example, the carbonization step S1, the metal impregnation step S2, and the heat treatment step S3. The catalyst of the present invention in this case may also be a carbon catalyst having a carbon structure in which such desorption of carbon monoxide and carbon dioxide as described above occurs in the temperature programmed desorption method.

Next, a specific example according to this embodiment is described.

Example 1

Example 1-1

Production of Carbon Catalyst PCoFe for Decomposing Hydrogen Peroxide

First, a raw material as an object to be carbonized was prepared. That is, 1.5 g of a polyacrylonitrile-polymethacrylic acid copolymer (PAN/PMA) were dissolved in 30 mL of dimethylformamide. After that, 1.5 g of 2-methylimidazole and 1.5 g of cobalt chloride hexahydrate ($CoCl_2.6H_2O$) were added to the solution, and then the mixture was stirred at room temperature for 2 hours. Ketjen black (ECP600JD manufactured by Lion Corporation) was added to the mixture thus obtained so as to account for 30 wt % of the solid content to be incorporated into the raw material, and then the contents were mixed with a mortar. The resultant mixture was vacuum-dried at 60° C. for 12 hours.

Further, the mixture was heated in the atmosphere so that its temperature was increased from room temperature to 150° C. in 30 minutes. Subsequently, the temperature was increased from 150° C. to 220° C. over 2 hours. After that, the mixture was held at 220° C. for 3 hours so that the mixture was made infusible. Thus, the raw material for a carbonized material was prepared.

Next, the carbonization of the raw material was performed. That is, the raw material subjected to the infusible treatment as described above was loaded into a quartz tube and subjected to nitrogen purge in an image furnace for 20 minutes, and then its temperature was increased from room temperature to 900° C. by heating over 18 minutes. After that, the raw material was held at 900° C. for 1 hour so as to be carbonized. Thus, a carbonized material was obtained.

Further, the carbonized material was pulverized. That is, zirconia balls each having a diameter of 10 mm were set in a planetary ball mill (P-7 manufactured by FRITSCH JAPAN CO., LTD.), and then a treatment for pulverizing the carbonized material with the planetary ball mill for 5 minutes at a rotational speed of 650 rpm was performed 10 cycles. After that, the pulverized carbonized material was taken out and passed through a sieve having an aperture of 106 μm. The carbonized material that had passed the sieve was obtained as a pulverized, fine particulate carbonized material.

Next, a metal impregnation treatment was performed. That is, a solution prepared by adding 2 g of iron(III) chloride hexahydrate ($FeCl_3.6H_2O$) to 300 mL of distilled water was boiled, and then 2 g of the carbonized material were added to the iron-containing solution. Then, the carbonized material was impregnated with iron for 3 hours while being stirred in the iron-containing solution that was boiling. After that, the solution containing the carbonized material was filtrated with a filtration film (having a pore diameter of 1.0 μm and manufactured by Millipore), and then the filtrate was washed with distilled water until the filtrate became neutral. The recovered carbonized material was vacuum-dried at 60° C. for 12 hours. Further, the dried carbonized material was pulverized with a mortar.

Next, a heat treatment was performed. That is, the carbonized material subjected to the metal impregnation treatment as described above was loaded into a quartz tube and subjected to nitrogen purge in an image furnace for 20 minutes, and then its temperature was increased from room temperature to 700° C. by heating over 14 minutes. After that, the carbonized material was held at 700° C. for 1 hour.

Further, the carbonized material after the heat treatment was pulverized. That is, zirconia balls each having a diameter of 10 mm were set in a planetary ball mill, and then a treatment for pulverizing the carbonized material with the planetary ball mill for 5 minutes at a rotational speed of 450 rpm was performed over 4 cycles. After that, the pulverized carbonized material was taken out and passed through a sieve having an aperture of 106 μm. The carbonized material that had passed through the sieve was obtained as a pulverized, fine particulate carbon catalyst for decomposing hydrogen peroxide (PCoFe).

Example 1-2

Production of Carbon Catalyst PCoFeAW for Decomposing Hydrogen Peroxide

The carbon catalyst for decomposing hydrogen peroxide (PCoFe) obtained in the Example 1-1 was subjected to a metal removal treatment by acid washing.

That is, 100 mL of concentrated hydrochloric acid were added to 1 g of the carbon catalyst (PCoFe), and then the mixture was stirred for 1 hour. After the carbon catalyst had been precipitated and the solution had been removed, 100 mL of a solution prepared by mixing concentrated hydrochloric acid and distilled water at 1:1 (volume ratio) were added to the carbon catalyst, and then the mixture was stirred for 1 hour. After the carbon catalyst had been precipitated and the solution had been removed, 100 mL of distilled water were added to the carbon catalyst, and then the mixture was stirred for 1 hour. The solution containing the carbon catalyst was filtrated with a filtration film (having a pore diameter of 1.0 μm and manufactured by Millipore), and then the filtrate was washed with distilled water until the filtrate became neutral. The recovered carbonized material was vacuum-dried at 60° C. for 12 hours. Further, the dried carbonized material was pulverized with a mortar.

Next, an after-metal removal heat treatment was performed. That is, the carbon catalyst subjected to the metal removal treatment as described above was loaded into a quartz tube and subjected to nitrogen purge in an image furnace for 20 minutes, and then its temperature was increased from room temperature to 700° C. by heating over 14 minutes. After that, the carbon catalyst was held at 700° C. for 1 hour.

Further, the carbon catalyst after the heat treatment was pulverized. That is, zirconia balls each having a diameter of 10 mm were set in a planetary ball mill, and then a treatment for pulverizing the carbonized material with the planetary ball mill for 5 minutes at a rotational speed of 450 rpm was performed over 4 cycles. After that, the pulverized carbonized material was taken out and passed through a sieve having an aperture of 106 μm. The carbonized material that had passed through the sieve was obtained as a pulverized, fine particulate carbon catalyst for decomposing hydrogen peroxide (PCoFeAW).

Example 1-3

Production of Carbon Catalyst CoFeAW for Decomposing Hydrogen Peroxide

A carbon catalyst (CoFeAW) was produced in the same manner as in the Example 1-2 except that the following raw material free of the PAN/PMA was used as a raw material for a carbonized material.

That is, 1.5 g of 2-methylimidazole and 1.5 g of cobalt chloride hexahydrate ($CoCl_2.6H_2O$) were added to 30 mL of dimethylformamide, and then the mixture was stirred at room temperature for 2 hours. Ketjen black (ECP600JD, Lion Corporation) was added to the mixture thus obtained so as to account for 43 wt % of the solid content to be incorporated into the raw material, and then the contents were mixed with a mortar. The resultant mixture was vacuum-dried at 60° C. for 12 hours. The dried mixture was subjected to the same heating treatment as that in the Example 1-1 so that the raw material for a carbonized material was prepared. Then, the subsequent procedure was performed in the same manner as in the Example 1-2. Thus, a pulverized, fine particulate carbon catalyst for decomposing hydrogen peroxide (CoFeAW) was obtained.

Example 1-4

Production of Carbon Catalyst PCoFeAWZr for Decomposing Hydrogen Peroxide

The carbon catalyst for decomposing hydrogen peroxide (PCoFeAW) obtained in the Example 1-2 was subjected to an additional metal impregnation treatment.

That is, a solution prepared by adding 2 g of zirconium chloride oxide octahydrate ($ZrCl_2O.8H_2O$) to 300 mL of distilled water was boiled, and then 2 g of the carbon catalyst (PCoFeAW) were added to the zirconium-containing solution. Then, the carbon catalyst was impregnated with zirconium for 3 hours while being stirred in the zirconium-containing solution that was boiling. After that, the solution containing the carbon catalyst was filtrated with a filtration film (having a pore diameter of 1.0 μm and manufactured by Millipore), and then the filtrate was washed with distilled water until the filtrate became neutral. The recovered carbon catalyst was vacuum-dried at 60° C. for 12 hours. Further, the dried carbon catalyst was pulverized with a mortar.

Next, an additional heat treatment was performed. That is, the carbon catalyst subjected to the additional metal impregnation treatment as described above was loaded into a quartz tube and subjected to nitrogen purge in an image furnace for 20 minutes, and then its temperature was increased from room temperature to 700° C. by heating over 14 minutes. After that, the carbon catalyst was held at 700° C. for 1 hour.

Further, the carbon catalyst after the heat treatment was pulverized. That is, zirconia balls each having a diameter of 1.5 mm were set in a planetary ball mill, and then a treatment for pulverizing the carbon catalyst with the planetary ball mill for 5 minutes at a rotational speed of 450 rpm was performed over 4 cycles. After that, the pulverized carbon catalyst was taken out and passed through a sieve having an aperture of 106 μm. The carbon catalyst that had passed through the sieve was obtained as a pulverized, fine particulate carbon catalyst for decomposing hydrogen peroxide (PCoFeAWZr).

Example 1-5

Production of Carbon Catalyst $PCoFeAWHNO_3$ for Decomposing Hydrogen Peroxide

The carbon catalyst for decomposing hydrogen peroxide (PCoFeAW) obtained in the Example 1-2 was subjected to an acid treatment.

That is, 100 mL of concentrated nitric acid were added to 1 g of the carbon catalyst (PCoFeAW) and stirred for 3 hours at normal temperature. After that, the solution containing the carbon catalyst was filtrated with a filtration film (having a pore diameter of 1.0 μm and manufactured by Millipore), and then the filtrate was washed with distilled water until the filtrate became neutral. The recovered carbon catalyst was vacuum-dried at 60° C. for 12 hours. Further, the dried carbon catalyst was pulverized with a mortar.

Next, an after-acid treatment heat treatment was performed. That is, the carbon catalyst subjected to the acid treatment as described above was loaded into a quartz tube and subjected to nitrogen purge in an image furnace for 20 minutes, and then its temperature was increased from room temperature to 700° C. by heating over 14 minutes. After that, the carbon catalyst was held at 700° C. for 1 hour.

Further, the carbon catalyst after the heat treatment was pulverized. That is, zirconia balls each having a diameter of 10 mm were set in a planetary ball mill, and then a treatment for pulverizing the carbon catalyst with the planetary ball mill for 5 minutes at a rotational speed of 450 rpm was performed over 4 cycles. After that, the pulverized carbon catalyst was taken out and passed through a sieve having an aperture of 106 μm. The carbon catalyst that had passed through the sieve was obtained as a pulverized, fine particulate carbon catalyst for decomposing hydrogen peroxide ($PCoFeAWHNO_3$).

Comparative Example 1-1

Production of Carbon Catalyst PCoAW

A pulverized, fine particulate carbon catalyst (PCoAW) was obtained as a catalyst according to Comparative Example 1-1 in the same manner as in the Example 1-2 except that none of the metal impregnation treatment, heat treatment, or pulverization treatment after the heat treatment were performed.

Comparative Example 1-2

Preparation of Manganese Dioxide Catalyst $MnO_2$

Manganese dioxide (FMV manufactured by TOSOH CORPORATION) was prepared as a catalyst according to Comparative Example 1-2.

Comparative Example 1-3

Preparation of Ketjen Black

Ketjen black (ECP600JD, Lion Corporation) as an electrically conducive carbon material was prepared as a carbonized material according to Comparative Example 1-3.

[Evaluation by Temperature Programmed Desorption Method]

The carbon catalysts for decomposing hydrogen peroxide produced in the Examples 1-2 to 1-5, the carbon catalyst produced in the Comparative Example 1-1, and the ketjen black (KB) prepared in the Comparative Example 1-3 were each evaluated by a temperature programmed desorption method. That is, a carbon catalyst was placed in a temperature programmed desorption apparatus (manufactured by BEL Japan, Inc.), the carbon catalyst was heated under a high vacuum such that a carrier gas (He) was made to flow at 50 mL/min, and a desorbed gas was subjected to measurement with a quadrupole mass spectrometer (QMS).

Specifically, first, the carbon catalyst was subjected to a pretreatment (desorption of a catalyst surface functional group by a heat treatment). That is, 0.02 g of the carbon catalyst was loaded into the central portion of a reaction tube made of quartz, and then the tube was set in the temperature programmed desorption apparatus. The temperature in the apparatus was increased to 50° C. at a rate of temperature increase of 5° C./min and then held at the temperature for 40 minutes so that the apparatus was stabilized. After that, the carbon catalyst was subjected to the heat treatment by heating the carbon catalyst to increase its temperature to 900° C. at a rate of temperature increase of 10° C./min. Thus, the functional group on its surface was desorbed.

Next, the surface of the carbon catalyst was caused to adsorb oxygen. That is, first, the temperature in the apparatus was held at 150° C. for 10 minutes so that the apparatus was stabilized. After that, an oxygen ($O_2$) gas was made to flow through the carbon catalyst subjected to the heat treatment as described above so as to have a concentration of 5 vol %, and then the carbon catalyst was held at 150° C. for 20 minutes so that the surface of the carbon catalyst (mainly an edge surface) was caused to chemically adsorb oxygen.

Next, the carbon catalyst was subjected to a heat treatment, and then desorbed carbon monoxide (CO) and carbon dioxide ($CO_2$) were subjected to measurement. That is, a helium (He) gas was made to flow in the apparatus at 150° C. for 25 minutes so that oxygen that had not chemically adsorbed was deaerated. Next, the temperature in the apparatus was increased from 150° C. to 900° C. at a rate of temperature increase of 10° C./min again. During the temperature increase, the helium (He) gas was made to flow at 50 mL/min, carbon monoxide and carbon dioxide produced by the desorption of an oxygen-containing compound were detected, and a correlation between a temperature (axis of abscissa) and a detected intensity (axis of ordinate) was recorded.

Then, the amounts of desorbed carbon monoxide and carbon dioxide were determined. That is, the integral values (detected intensity areas) of the detected intensities of carbon monoxide and carbon dioxide from 150° C. at which the heat treatment was initiated to the temperature (400° C. or 900° C.) at which it was wished to determine the amounts were each calculated. Meanwhile, a calibration curve illustrating a correlation between the desorption amount of each of carbon monoxide and carbon dioxide, and its detected intensity area, was created by using a predetermined amount of calcium oxalate monohydrate ($CaC_2O_4 \cdot H_2O$) as a reference substance. Specifically, the calibration curve was obtained by subjecting 0.02 g of a sample, which was obtained by mixing alumina and calcium oxalate monohydrate ($CaC_2O_4 \cdot H_2O$) so that the content of calcium oxalate was 250, 500, 750, or 1,000 μmol, to a heat treatment under the conditions described above. Then, the desorption amounts (release amounts) of carbon monoxide and carbon dioxide from the carbon catalyst were determined on the basis of the detected intensity areas obtained by the measurement and the calibration curve.

Figure 3:
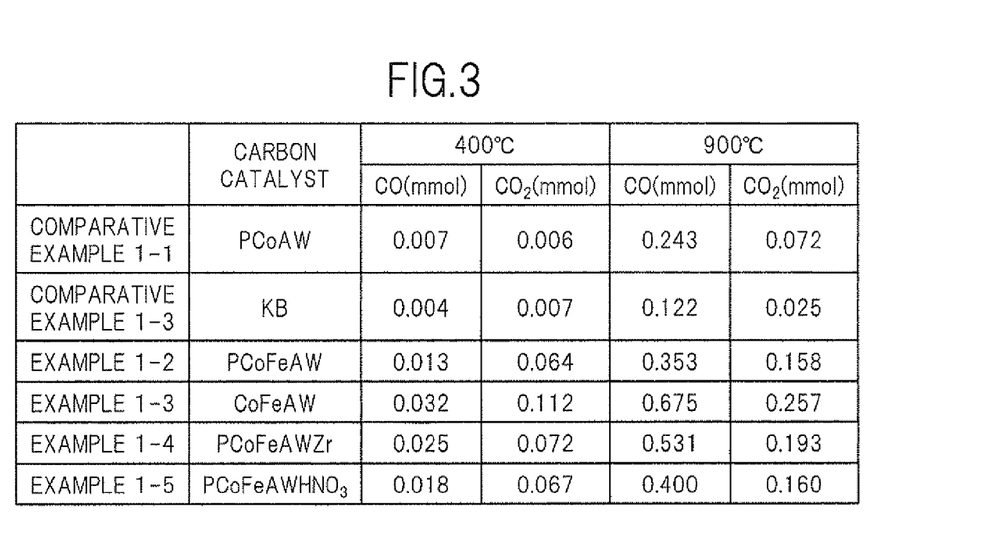
FIG. 3 is an explanatory diagram illustrating an example of a result of the evaluation of the carbon catalyst for decomposing hydrogen peroxide by a temperature programmed desorption method in the embodiment of the present invention.

FIG. 3 illustrates the results of the evaluations of the respective carbon catalysts for their desorption amounts of carbon monoxide and carbon dioxide in the temperature programmed desorption method from 150° C. to 400° C. or 900° C. As illustrated in FIG. 3, the desorption amounts of each of the carbon catalysts for decomposing hydrogen peroxide that were subjected to a metal impregnation treatment (Examples 1-2 to 1-5) were significantly larger than those of the carbon catalysts that were not subjected to the metal impregnation treatment (Comparative Example 1-1) and the electrically conductive carbon material (Comparative Example 1-3). That is, the metal impregnation treatment significantly increased the desorption amounts of carbon monoxide and carbon dioxide in the temperature programmed desorption method.

The results show that the metal impregnation treatment increased the amount of the edge surfaces of carbon in the carbon catalyst, i.e., increased its active surface area. Therefore, an improvement in catalytic activity on the decomposition of hydrogen peroxide shown in Examples 2 and 3 to be described later was considered to be attributable to an increase in the amount of the edge surfaces (increase in the active surface area) as a result of the metal impregnation treatment.

Example 2

[Evaluation for Catalytic Activity on Decomposition of Hydrogen Peroxide]

1.5 Milligrams of any one of the carbon catalysts for decomposing hydrogen peroxide produced in the Examples 1-2 to 1-4, the carbon catalyst produced in the Comparative Example 1-1, and the manganese dioxide catalyst prepared in the Comparative Example 1-2 were added to 30 mL of an aqueous solution containing hydrogen peroxide ($H_2O_2$) at a concentration of 3,400 mg/L, and then the mixture was held at room temperature (27° C.) for 20 minutes while being stirred with a stirrer.

In the aqueous solution of hydrogen peroxide, a gas was generated immediately after the addition of the catalyst. Immediately after a lapse of 20 minutes, the aqueous solution of hydrogen peroxide was filtrated with a membrane filter having a pore diameter of 0.45 μm so that the catalyst and the aqueous solution were separated from each other. Then, the hydrogen peroxide concentration of the filtrate was determined by permanganic acid titration. In addition, the decomposition ratio of hydrogen peroxide was calculated from the following equation: "decomposition ratio (%)={hydrogen peroxide concentration before treatment (mg/L)−hydrogen peroxide concentration after treatment (mg/L)}/hydrogen peroxide concentration before treatment (mg/L)×100."

Figure 4:
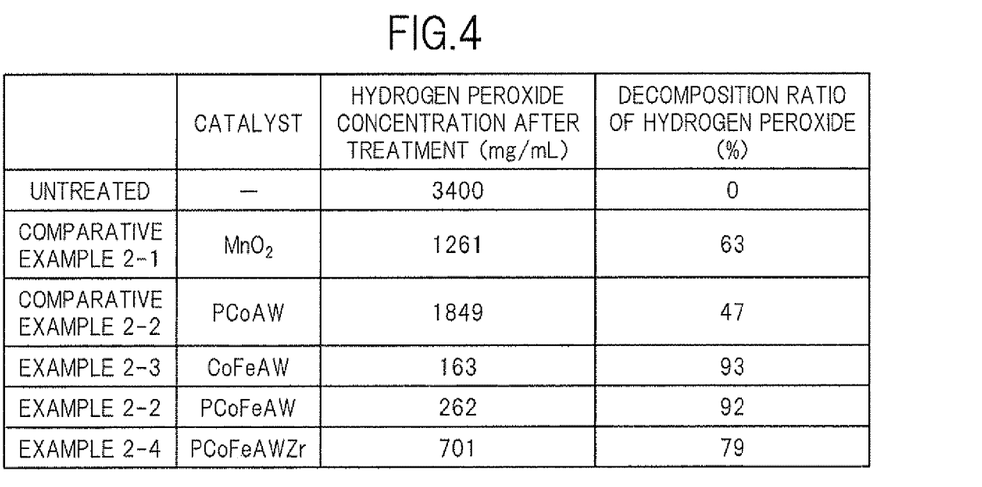
FIG. 4 is an explanatory diagram illustrating an example of a result of the evaluation of the carbon catalyst for decomposing hydrogen peroxide according to the embodiment of the present invention for its catalytic activity.

FIG. 4 illustrates the result of such evaluation of each catalyst for its catalytic performance on the decomposition of hydrogen peroxide as described above. As illustrated in FIG. 4, in the case where any one of the carbon catalysts for decomposing hydrogen peroxide was used (Examples 2-2 to 2-4), a high decomposition ratio of hydrogen peroxide was achieved compared with that in the case where one of the manganese dioxide catalyst according to Comparative Example 2-1 and the carbon catalyst according to Comparative Example 2-2 was used. That is, it was confirmed that the carbon catalysts for decomposing hydrogen peroxide used in the Examples 2-2 to 2-4 each had a significantly greater catalytic activity on the decomposition of hydrogen peroxide than those of the catalysts used in the Comparative Examples 2-1 and 2-2.

It should be noted that when 1.5 mg of carbon black (Ketjen Black ECP600JD manufactured by Lion Corporation), a graphite powder (KS5-75 manufactured by TIMCAL Japan K.K.), or steam-activated activated carbon (SHIRASAGI TC manufactured by Japan EnviroChemicals, Limited) was added to 30 mL of an aqueous solution containing hydrogen peroxide ($H_2O_2$) at a concentration of 3,400 mg/L instead of any such catalyst as described above, the generation of a decomposed gas was not visually observed and hence substantially no reaction occurred.

Example 3

[Production of Catalyst Molded Body for Decomposing Hydrogen Peroxide]

A polyvinyl butyral (PVB) solution prepared by dissolving a PVB 1000 (polymerization degree: 900 to 1,100, manufactured by Wako Pure Chemical Industries, Ltd.) as a water-insoluble polymer in methanol so that its concentration was 10 wt %, and a polyacrylic acid (PMA) solution prepared by dissolving a PMA (Mw-25,000, manufactured by Wako Pure Chemical Industries, Ltd.) as a water-soluble polymer in methanol so that its concentration was 10 wt % were mixed at a volume ratio of 4:1. Thus, a polymer binder solution was prepared.

The carbon catalyst for decomposing hydrogen peroxide (PCoFeAW) produced in the Example 1-2 was added to the polymer binder solution so that its concentration was 50 wt %, and then the contents were mixed. Thus, catalyst slurry (catalyst composition for application) was prepared. The catalyst slurry was coated on the surface of a substrate having a surface area of 1 cm$^2$ and then dried. Thus, a molded body formed of the catalyst and the polymer binder was produced.

Next, the molded body was immersed in water so that the polyacrylic acid was eluted from the molded body. Thus, a film-like catalyst molded body for decomposing hydrogen peroxide having a porous structure formed by the removal of the polyacrylic acid was obtained.

[Production of Manganese Dioxide-containing Catalyst Molded Body]

A film-like, manganese dioxide-containing catalyst molded body having a porous structure formed by the removal of the polyacrylic acid was obtained in the same manner as in the catalyst molded body for decomposing hydrogen peroxide, except that manganese dioxide (FMV manufactured by TOSOH CORPORATION) ($MnO_2$) was used instead of the carbon catalyst for decomposing hydrogen peroxide.

[Evaluation for Catalytic Activity on Decomposition of Hydrogen Peroxide]

The catalyst molded body for decomposing hydrogen peroxide obtained as described above was immersed in an aqueous solution containing hydrogen peroxide at a concentration of 3,000 mg/L, and then the mixture was held at room temperature (27° C.) for 120 minutes. Immediately after a lapse of 120 minutes, the catalyst molded body for decomposing hydrogen peroxide was taken out of the aqueous solution of hydrogen peroxide. Then, the concentration of hydrogen peroxide incorporated into the aqueous solution after the treatment was determined by permanganic acid titration, and then the decomposition ratio of hydrogen peroxide was calculated in the same manner as in the Example 1. As a result, the decomposition ratio of hydrogen peroxide was 36%.

Meanwhile, the aqueous solution of hydrogen peroxide was treated in the same manner as in the foregoing except that the manganese dioxide-containing catalyst molded body obtained as described above was used instead of the catalyst molded body for decomposing hydrogen peroxide. As a result, the decomposition ratio of hydrogen peroxide was 14%.

That is, it was confirmed that the catalyst molded body containing the carbon catalyst for decomposing hydrogen peroxide had a higher catalytic activity on the decomposition of hydrogen peroxide than the catalyst molded body containing manganese dioxide did.

Example 4

Example 4-1

Water Treatment 1 with Carbon Catalyst for Decomposing Hydrogen Peroxide

Waste water having a pH of 6.5 to 7.5 was prepared as raw water as an object to be treated. The filtrate obtained by filtrating the raw water to remove a suspended substance had a CODMn of 53 mg/L, a CODCr of 99 mg/L, a TOC of 54 mg/L, and a chromaticity of 391. In addition, the BOB of the filtrate obtained by subjecting the raw water to centrifugal separation at 10,000 rpm for 10 minutes to remove the suspended substance was 40 mg/L.

It should be noted that the CODMn was measured by a method in conformity with JIS K 0102-17 and the CODCr was measured by a method in conformity with JIS K 0102-20. In addition, the TOC was measured with a water quality analyzer (DR2400) manufactured by HACH by a method in conformity with a TOC (moderate concentration) measurement method with a management number of 10173, and the chromaticity was measured with the water quality analyzer by a method in conformity with a chromaticity measurement method (platinum-cobalt standard method) with a management number of 8025.

Then, the raw water was treated with a carbon catalyst for decomposing hydrogen peroxide. That is, first, 200 mL of the raw water were charged into a container having a volume of 500 mL. The carbon catalyst PCoFeAW for decomposing hydrogen peroxide produced in the Example 1-2 was added to the raw water so that its concentration was 400 mg/L. Further, 2 mL of hydrogen peroxide water adjusted in advance so that its concentration in the raw water was 100 mg/L were added.

Then, the raw water containing the carbon catalyst and hydrogen peroxide was shaken at room temperature (27° C.) for 15 minutes. After the shaking, the treated liquid was filtrated with a filter having a pore diameter of 0.45 μm so that the carbon catalyst was separated. The CODMn, CODCr, TOC, and chromaticity of the resultant filtrate were measured.

Example 4-2

Water Treatment 2 with Carbon Catalyst for Decomposing Hydrogen Peroxide

The raw water was treated with the carbon catalyst PCoFeAW for decomposing hydrogen peroxide in the same manner as in the Example 4-1 except that hydrogen peroxide water adjusted in advance so that its concentration in the raw water was 500 mg/L was added.

Example 4-3

Water Treatment 3 with Carbon Catalyst for Decomposing Hydrogen Peroxide

The raw water was treated with the carbon catalyst PCoFeAW for decomposing hydrogen peroxide in the same manner as in the Example 4-2 except that before the addition of the carbon catalyst for decomposing hydrogen peroxide, sulfuric acid was added to the raw water to adjust its pH to 3 to 9.

Comparative Example 4-1

Water Treatment 1 by Fenton Method

The raw water was treated by the Fenton method. That is, first, sulfuric acid was added to the raw water to adjust its pH to 3 to 4. 200 Milliliters of the raw water were charged into a container having a volume of 500 mL. Next, iron(II) chloride ($FeCl_2$) was added to the raw water so that its concentration in the raw water was 400 mg/L. Further, 2 mL of hydrogen peroxide water adjusted in advance so that its concentration in the raw water was 100 mg/L were added.

Then, the raw water containing iron(II) chloride and hydrogen peroxide was shaken at room temperature (27° C.) for 15 minutes. After the shaking, sodium hydroxide was added to the treated liquid so that iron was precipitated as a hydroxide. Next, the treated liquid was filtrated with filter paper (ADVANTEC 5C) so that the precipitate was removed. The filtrate was further filtrated with a filter having a pore diameter of 0.45 µm. The CODMn, CODCr, TOO, and chromaticity of the resultant filtrate were measured.

Comparative Example 4-2

Water Treatment 2 by Fenton Method

The raw water was treated by the Fenton method in the same manner as in the Example 4-1 except that hydrogen peroxide water adjusted in advance so that its concentration in the raw water was 500 mg/L was added.

Comparative Example 4-3

Water Treatment with Manganese Dioxide

The raw water was treated with manganese dioxide ($MnO_2$) in the same manner as in the Example 4-1 except that the manganese dioxide was used instead of the carbon catalyst.

Comparative Example 4-4

Water Treatment with Cobalt Oxide

The raw water was treated with cobalt oxide (CoO) in the same manner as in the Example 4-2 except that the cobalt oxide was used instead of the carbon catalyst.

[Result of Evaluation for Catalytic Activity on Water Quality Improvement]

Figure 5:
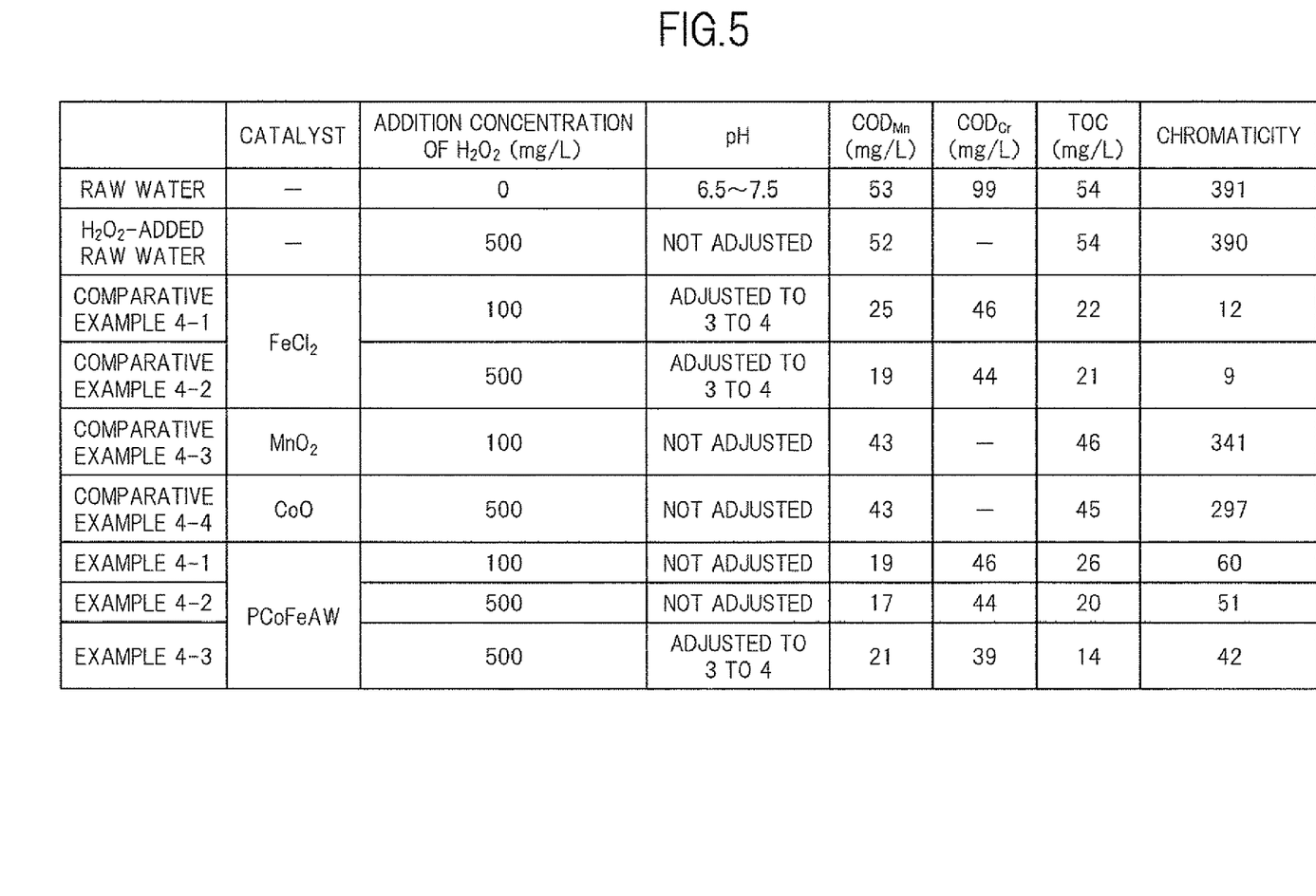
FIG. 5 is an explanatory diagram illustrating another example of the result of the evaluation of the carbon catalyst for decomposing hydrogen peroxide according to the embodiment of the present invention for its catalytic activity.

FIG. 5 illustrates the result of an evaluation for a catalytic activity on a water quality improvement in each example together with treatment conditions. It should be noted that the symbol "-" illustrated in the column "CODCr" of FIG. 5 means that no measurement was performed.

As illustrated in FIG. 5, the use of the carbon catalyst for decomposing hydrogen peroxide was able to effectively reduce the CODMn, CODCr, TOC, and chromaticity of the raw water (Examples 4-1 to 4-3). That is, it was confirmed that the carbon catalyst for decomposing hydrogen peroxide showed a significant catalytic activity on the decomposition of an organic substance in the presence of hydrogen peroxide.

Moreover, a sufficient water quality improvement was achieved merely by adding the carbon catalyst for decomposing hydrogen peroxide to the neutral raw water having a pH of 6.5 to 7.5 together with hydrogen peroxide (Examples 4-1 and 4-2), without adjusting the pH to an acidic region like the Fenton method (Comparative Examples 4-1 and 4-2).

In contrast, in the case where manganese dioxide or cobalt oxide (Comparative Examples 4-3 and 4-4) was used, a water quality-improving effect comparable to that in the case where the carbon catalyst for decomposing hydrogen peroxide was used could not be obtained. It should be noted that as illustrated in the column "$H_2O_2$-added raw water," the water quality was not improved at all merely by adding hydrogen peroxide so that its concentration in the raw water was 500 mg/L.

The invention claimed is:

1. A method for decomposing hydrogen peroxide comprising:
    contacting hydrogen peroxide with a carbon catalyst,
        wherein a total of a desorption amount of carbon monoxide and a desorption amount of carbon dioxide in a temperature programmed desorption method from 150° C. to 400° C. is 0.06 mmol or more per 0.02 g of the carbon catalyst.

2. The method of claim 1, wherein the desorption amount of carbon monoxide is 0.01 mmol or more and the desorption amount of carbon dioxide is 0.05 mmol or more.

3. The method of claim 1, wherein the carbon catalyst is obtained by:
    impregnating a carbonized material, which is obtained by carbonization of raw materials containing an organic compound as a carbon source, a metal, and an electrically conductive carbon material, with a metal, and
    subjecting the resultant to a heat treatment.

4. The method of claim 1, wherein the hydrogen peroxide is in a solution, a gas, or a mist.

5. The method of claim 1, further comprising promoting decomposition of an organic substance by contacting the carbon catalyst with a solution, a gas, or a mist containing the organic substance in the presence of the hydrogen peroxide.

6. The method of claim 1, wherein the carbon catalyst is contained in a catalyst molded body that further comprises a polymer binder.

7. The method of claim 6, wherein the polymer binder contains a water-soluble polymer and a water-insoluble polymer.

8. The method of claim 6, wherein the catalyst molded body has a porous structure formed by treating a molded body, which contains the carbon catalyst, and the polymer binder containing a water-soluble polymer and a water-insoluble polymer, with an aqueous solution to remove the water-soluble polymer in the polymer binder from the molded body.

9. The method of claim 7, wherein the water-soluble polymer comprises one or two or more kinds selected from the group consisting of a polyacrylic acid, a polyethylene glycol, and a polyvinyl alcohol.

10. The method of claim 1, wherein the carbon catalyst is contained in a catalyst composition that further comprises a polymer binder containing a water-soluble polymer and a water-insoluble polymer.

* * * * *